United States Patent

[11] 3,591,319

| [72] | Inventor | Theodore Shlisky Bayside, N.Y. |
|---|---|---|
| [21] | Appl. No. | 807,892 |
| [22] | Filed | Mar. 17, 1969 |
| [73] | Assignee | Scientific Industries, Inc. Hempstead, N.Y. |

[54] FLOW CONDUIT PROTECTIVE MEMBER FOR PERISTALTIC PUMP
2 Claims, 3 Drawing Figs.

[52] U.S. Cl. .................................................. 417/477, 417/MD
[51] Int. Cl. .................................................... F04b 43/03, F04b 43/12
[50] Field of Search ........................................ 103/149; 230/168; 415/476, 477

[56] References Cited
UNITED STATES PATENTS
| 2,899,906 | 8/1959 | Becher et al. .............. | 103/149 |
| 3,073,250 | 1/1963 | Musser ...................... | 103/149 |
| 3,176,622 | 4/1965 | Pfeiffer ...................... | 103/149 |
| 3,335,670 | 8/1967 | Williams .................... | 103/149 |
| 3,397,739 | 8/1968 | Miller ........................ | 103/149 |

Primary Examiner—Henry F. Raduazo
Attorney—Ostrolenk, Farber, Gerb and Soffen

ABSTRACT: In a peristaltic pump comprising at least one flexible conduit through which fluid is pumped by occluding the conduit at one location and then moving the occlusion downstream along the conduit, and comprising at least one occlusion means for occluding the conduit and for being moved downstream over the conduit, a conduit protective member positioned between the occluding means and the conduit so that as the occluding means moves over the conduit, it rubs the conduit protective member, and not the conduit; the protective member being sufficiently flexible so as not to interfere with the occlusion of the conduit and being formed of material having a low coefficient of friction so as to reduce rubbing between contacting elements.

PATENTED JUL 6 1971 3,591,319

INVENTOR.
THEODORE SHLISKY
BY
OSTROLENK, FABER, GERB & SOFFEN
ATTORNEYS

FLOW CONDUIT PROTECTIVE MEMBER FOR PERISTALTIC PUMP

This invention relates to peristaltic pumps and particularly to a means for protecting and for prolonging the useful life of the fluid carrying conduit of a peristaltic pump.

A peristaltic pump uses the principle of peristalsis to pump fluid. Part of the path of flow of a fluid, whether the fluid be liquid or gas, comprises a flexible conduit. Occluding means for squeezing and occluding the conduit is provided. Means also are provided for supporting the conduit in engagement with the occluding means so that occlusion of the conduit may occur. Once the occlusion means has made contact with the conduit and has occluded it, the occlusion means is moved downstream over the conduit, all the while exerting occluding pressure. Thus, the occluded locations of the conduit move downstream through the conduit. Fluid downstream of the occluded locations is forced downstream and fluid upstream of these locations is sucked into the conduit above each location. In this manner, fluid is pumped by the peristaltic pump.

Where the occluding means comprises an element having sufficient inflexibility to squeeze the wall of the conduit and occlude same, as the occluding means moves downstream over the conduit, it rubs the wall of the conduit with which it is in contact, thereby wearing out and stretching that wall. Stretching of the conduit weakens it and also reduces the force with which the conduit is squeezed against the occluding means, whereby the occluding means can no longer effectively pinch the conduit. Furthermore, the fluid flow conduit has only a portion of its wall in contact with the occluding means. Therefore, stretching and wearing of the conduit is limited to the surfaces in contact with the occluding means. Such uneven stretching and wearing causes premature breakage and deformation of the conduit. As the conduit stretches unevenly, the diameter and shape of the stretched portion changes. With an unstretched conduit, the volume of fluid pumped is predictable. As the conduit deforms the volume of fluid pumped through it will change and no longer be predictable. Quite often, liquid being pumped by a peristaltic pump will have air bubbles dispersed in it. The size, shape, frequency and location of the bubbles will undesirably and unpredictably change when the shape and cross-sectional area of the pump conduit changes.

With prior art pumps, the speed at which the occluding means may move over the conduit is limited since too rapid speed undesirably increases the influence of the frictional engagement between the occluding means and the conduit, thereby very rapidly both wearing out and unevenly stretching the conduit.

To overcome undesirable wearing and stretching of the fluid carrying conduit, a number of improvements are shown in the prior art. First, the occluding means and/or the fluid carrying conduit are formed of a material having a low coefficient of friction since the downstream vectors of force exerted by the occluding means are directly related to the degree of frictional engagement between these elements. Second, the occluding means is rounded so that no sharp edges engage the conduit and exert a disproportionate localized pressure. Third, the occluding means is in the form of a relatively friction free rotatable roller which rolls along the surface of the conduit instead of merely rubbing along it. Yet, these improvements do not sufficiently reduce wear on the pump conduit.

To reduce conduit wear, the present invention contemplates the provision of a conduit protective member, usually separate from the occluding means and the conduit means, positioned between the occluding means and the conduit. The protective member is supported by appropriate support means on the peristaltic pump. The member is comprised of material which is sufficiently flexible and is mounted with sufficient slack that the pressure of the occluding means on the member is readily transmitted to the conduit and occludes same. Since the protective member is separate from the conduit, stretching of the protective member does not affect the conduit. Usually, the protective member is comprised of a material which resists stretching.

The protective member is also comprised of material having a low coefficient of friction, so that the vectors of force downstream along the conduit are dissipated in the member and are not transmitted to the conduit to stretch it. By choosing a material for the protective member with a proper coefficient of friction, the unavoidable initial stretching of the member can be divided between the two sides of the protective member, viz. that in contact with the occluding means and that in contact with the conduit. This would extend the useful life of the protective member, because there would be less stress concentration with equal distribution of stretching, rather than if all of the initial stretch were taken up by one side of the member.

It has been found by the inventor that using a flow conduit protective member substantially prolongs the useful lifetime of a peristaltic pump conduit, as compared to the useful lifetime of such conduit on a conventional peristaltic pump without such member.

A peristaltic pump employing the protective member disclosed herein can be operated much more rapidly than a conventional peristaltic pump, without the conduit suffering damaging wear.

It is to be understood that the invention is in no way limited as to the number of conduits which may be occluded by a single occluding means, or as to the number of occluding elements provided for the peristaltic pump, or as to the particular manner in which the occluding elements are designed.

It is a primary object of the present invention to provide an improved peristaltic pump.

It is another object of the present invention to protect the fluid flow conduit of a peristaltic pump.

It is another object of the present invention to provide a means for prolonging the useful life of the fluid-carrying conduit of a peristaltic pump.

. It is another object of the present invention to provide a means for reducing the downstream force vectors on the fluid-carrying conduit of a peristaltic pump.

It is a further object of the present invention to reduce the frictional drag between the occluding means and the fluid-carrying conduit of a peristaltic pump.

It is another object of the present invention to reduce undesirable stretching of the fluid-carrying conduit of a peristaltic pump.

It is another object of the present invention to accomplish the foregoing objects without interfering with the occluding ability of the occluding means of a peristaltic pump.

It is a further object of the present invention to provide a means which permits a peristaltic pump to be operated at greater speeds than heretofore without undesirable wear on the fluid-carrying conduit of the peristaltic pump.

It is another object of the present invention to eliminate contact between the occluding means and the fluid-carrying conduit of a peristaltic pump.

It is another object of the present invention to provide a conduit protective member between the occluding means and the fluid-carrying conduit of a peristaltic pump which member dissipates the vectors of force that undesirably wear and stretch the conduit.

These and other objects of the present invention will become apparent when the following description is read in conjunction with the accompanying drawings, in which.

Figure 1:
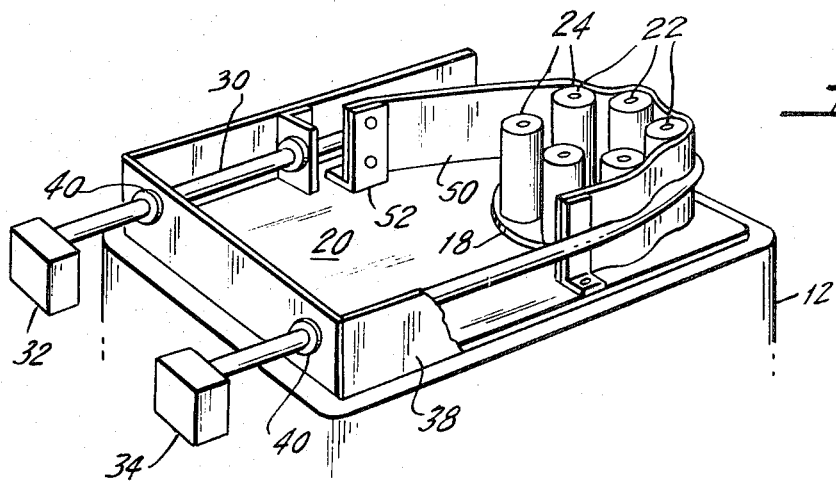
FIG. 1 is a perspective view of a peristaltic pump adapted with the fluid-carrying conduit preserving member of the present invention.
Figure 2:
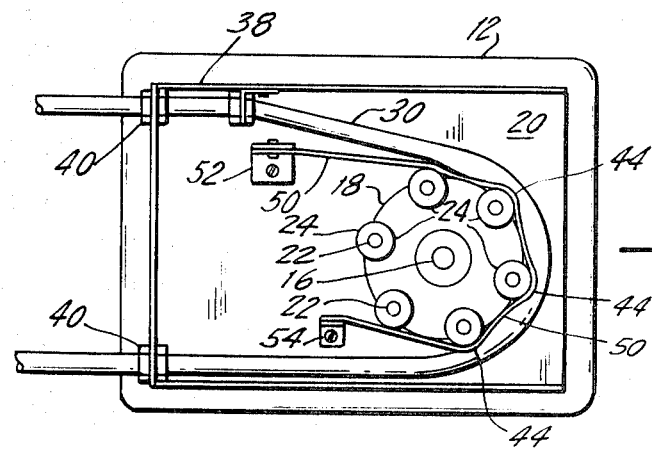
FIG. 2 is a front view of the pump shown in perspective in FIG. 1.
Figure 3:
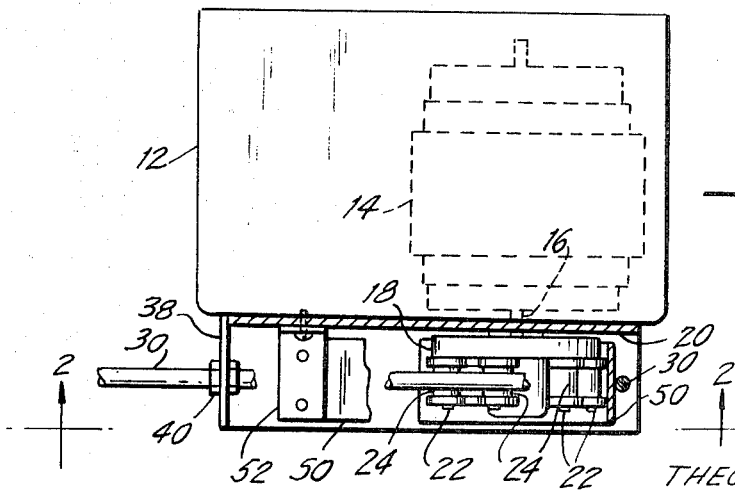
FIG. 3 is a side view of the pump shown in FIG. 1.

Turning to the Figures, the pump has a housing 12 in which is positioned a motor 14 for operating the pump occluding means to be described. Motor 14 is a conventional motor for rotating operating shaft 16. Secured to shaft 16 is disc 18 which is spaced a short distance from the front face 20 of pump housing 12. Disc 18 is rotated by motor 14.

Secured to disc 18 are a plurality of occluding means support shafts 22. Positioned on shafts 22 and rotatable around them are rollers 24 formed of relatively inflexible material having a low coefficient of friction, e,g. Teflon. Each roller 24 is freely rotatable around its own support shaft in order to reduce the frictional drag caused by the rollers moving over member 50 to be described. Using material having a low coefficient of friction reduces the frictional drag of the rollers. The number of rollers 24 provided is a matter of choice. In addition, the particular manner in which the occluding means 24 is arranged and moves is a matter of choice with the designer so long as peristaltic pump operation occurs as described further below.

At least one fluid flow conduit 30 is provided through which fluid is conducted from source 32 to receiver 34. More than one fluid flow conduit may be operated by the same occluding means and the invention is adaptable for use with a plurality of conduits. Conduit 30 is hollow to permit fluid to pass through it. As will be described further below, the conduit is engaged by the occluding means, rollers 24, and is squeezed and occluded by the rollers 24. The conduit has a wall surrounding it, and at least that portion of the wall which is contacted by the occluding rollers 24 is made resiliently flexible so that the squeezing pressure of the rollers will occlude the conduit at the locations where pressure is applied to the conduit. In its simplest form, the entire conduit may be comprised of resiliently flexible material.

The section of conduit 30 upon which the rollers 24 apply pressure is comprised of a material having a low coefficient of friction to reduce undesirable drag on the rollers or stretching of the conduit.

A conduit protective member 50 is disposed between the conduit 30 and the rollers 24. It is shown as being supported on the pump housing by fixed brackets 52 and 54. The downstream end of member 50 may be free, instead of being held by bracket 54. Member 50 comprises a length of material, which is sufficiently flexible and slack that the occluding pressures applied by rollers 24 to member 50 are not dissipated by the member and are properly transmitted to and act upon conduit 30. The material of member 50 is relatively inelastic so that it will not be stretched or substantially deformed by the continuous downstream pull exerted by rollers 24. At least the portion of the intermediate member which is in contact with the rollers 24 and the conduit 30 is comprised of a material having a low coefficient of friction, e.g. polytetrafluoroethylene, marketed under the trademark Teflon. Member 50 dissipates the downstream force vectors caused by the frictional drag between rollers 24 and intermediate member 50.

As has been noted above, member 50 permits continued operation of a peristaltic pump employing such member for a considerably longer period without undesirable wear and stretching of conduit 30 than is possible with a substantially identical peristaltic pump not employing member 50. In addition, the pump is capable of prolonged operation at high speeds, unlike conventional peristaltic pumps. With the invention, the fluid-carrying conduit only receives the radially inward occluding pressures and is not influenced by the downstream vectors of force, thereby reducing undesirable stretching wear and deformation of conduit 30.

Although the invention has been described above with respect to its preferred embodiments, it will be understood that many variations and modifications will be obvious to those skilled in the art. It is preferred, therefore, that the scope of the invention be limited not by the specific disclosure herein but only the the appended claims.

I claim:

1. In a peristaltic pump comprising at least one conduit having a flexible wall, whereby said conduit may be occluded by squeezing of said flexible wall,
    an occlusion means positioned to contact said flexible wall to squeeze it and to occlude said conduit;
    conduit support means for holding said conduit wall in squeezing contact with said occlusion means;
    operating means connected to said occlusion means for moving said occlusion means progressively along said flexible wall while said occlusion means continuously squeezes said wall, whereby fluid material in said conduit is moved therethrough downstream of the progressively moving occlusion means;
    said occlusion means including at least one squeezing element extending across said conduit and having a dimension, in the direction of extension of said conduit, considerably smaller than the length of said conduit;
    the improvement comprising, a fluid flow conduit protective member comprised of a material having a low coefficient of friction, positioned between said conduit and said occlusion means for reducing wear and stretching of said conduit; said occlusion means contacting said protective member and the latter contacting said conduit; said protective member being sufficiently flexible that the squeezing by said occlusion means squeezes said conduit wall to occlude said conduit;
    said occlusion means and said conduit wall each being comprised of a material having a low coefficient of friction;
    said protective member being separate from said occlusion means and from said conduit wall;
    support means connected to said protective member and joined to said pump for holding said protective member in position.

2. In the peristaltic pump of claim 1, the improvement further comprising,
    said material of said protective member being polytetrafluoroethylene.